United States Patent [19]

Castonguay

[11] 4,424,425
[45] Jan. 3, 1984

[54] CIRCUIT BREAKER COMPARTMENT SHIELD ASSEMBLY

[75] Inventor: Roger N. Castonguay, Terryville, Conn.

[73] Assignee: General Electric Company, New York, N.Y.

[21] Appl. No.: 511,070

[22] Filed: Jul. 5, 1983

Related U.S. Application Data

[63] Continuation-in-part of Ser. No. 324,336, Dec. 7, 1981, abandoned.

[51] Int. Cl.³ .......................... H01H 9/22; H02B 1/04
[52] U.S. Cl. ................................. 200/50 AA; 361/345
[58] Field of Search .................. 200/50 AA; 361/337, 361/339, 343, 345

[56] References Cited

U.S. PATENT DOCUMENTS

| | | | |
|---|---|---|---|
| 2,340,082 | 1/1944 | Sauers | 361/337 |
| 3,614,350 | 10/1971 | Eichelberger et al. | 361/345 X |
| 4,183,073 | 1/1980 | Clausing | 361/345 |
| 4,285,026 | 8/1981 | Clausing | 361/345 |

Primary Examiner—J. R. Scott
Attorney, Agent, or Firm—Richard A. Menelly; Walter Bernkopf; Fred Jacob

[57] ABSTRACT

A shield assembly for isolating line and load stabs within a circuit breaker compartment when the circuit breaker is removed from the compartment. The assembly consists of a pair of separately hinged shields interconnected by a link which terminates in a moveable pin. The pin is captured in a first slot within the assembly actuator arm and in a second slot within a supportive side frame. Movement of the actuator arm in a first direction causes the connecting link pin to move within the first slot to open the shields. Return of the actuator arm in an opposite direction causes the connecting link pin to travel within the second slot in an opposite direction to close the shields. The shield assembly contains actuating mechanisms at both sides of the breaker compartment in order to defeat any attempt by an operator to open the shields with the breaker withdrawn from the compartment.

15 Claims, 8 Drawing Figures

CIRCUIT BREAKER COMPARTMENT SHIELD ASSEMBLY

This is a continuation-in-part of co-pending Ser. No. 324,336 filed Dec. 7, 1981 now abandoned.

BACKGROUND OF THE INVENTION

U.S. Patent application Ser. No. 322,348 entitled "Interchangeable Shield Arrangement For A Circuit Breaker Compartment" and incorporated herein for purposes of reference, discloses several United States patents relating to shield mechanisms for isolating line and power stabs within circuit breaker compartments. U.S. Patent No. 2,340,082 also teaches the use of a shield arrangement for use within a circuit breaker compartment.

Most of the arrangements described within the aforementioned United States patent are designed for insertion within circuit breaker compartments prior to installation of the circuit breakers later in the field. The U.S. Patent application describes a specific arrangement for use within a circuit breaker compartment which contains Power Break circuit breakers, which is a registered trademark describing General Electric's low voltage power circuit breakers having 600 to 4000 ampere ratings. The shield arrangement of the instant invention can be used within circuit breaker compartments which contain breakers having a lower ampere rating.

SUMMARY OF THE INVENTION

A field installable shield assembly for use within circuit breaker compartments comprising separately hinged shields pivotably connected by a connecting link. The connecting link has a movable pin which travels within a first slot in an actuator arm and a second slot within a supportive frame. Movement of the actuator arm in a first direction motivates the connecting link pin to travel within the first and second slots for opening the movable shields. Movement of the actuator arm in a second direction motivates the connecting link pin to travel within the first and second slots for closing the movable shield. In one embodiment, the shield assembly includes an elongated side frame and horizontal shield for use within fused circuit breaker compartments.

DESCRIPTION OF THE PREFERRED EMBODIMENT

Figure 1:
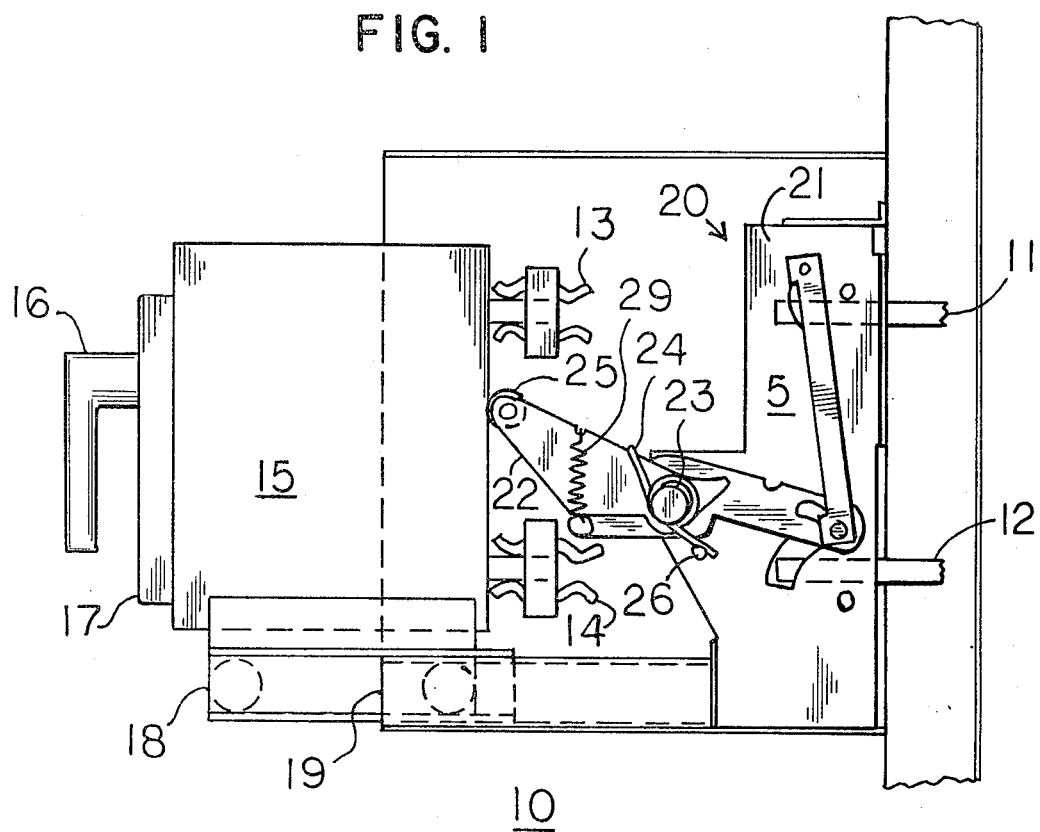
FIG. 1 is a side view of a circuit breaker compartment containing the shield assembly according to the invention.

FIG. 1 shows a breaker compartment 10 containing line stabs 11 and load stabs 12 for mating with corresponding line plugs 13 and load plugs 14 on the rear surface of a circuit breaker 15. Breaker 15 is of the type having an operable handle 16 and a control panel 17 and is slideably mounted on a moveable track 18 and a fixed track 19 for insertion and removal from compartment 10. Interposed between line and load stabs 11, 12 and line and load plugs 13, 14 is a shield assembly 5 shown on the right-hand side of breaker 15. Complimentary shield side assemblies 20, 20' (FIG. 4) are included on the left-hand and right-hand sides of breaker 15 for purposes which will be described below. Shield assembly 5 consists of a side frame 21 and a primary actuator arm 22 attached to side frame 21 by means of a pivot pin 23. Return spring 24 connects between primary actuator arm 22 and return spring pin 26 in the unactuated position indicated in FIG. 1. Breaker contact pin 25 comes into contact with a rear portion of circuit breaker 15 to operate shield assembly 5 when breaker 15 is slideably inserted within compartment 10.

Figure 2A:
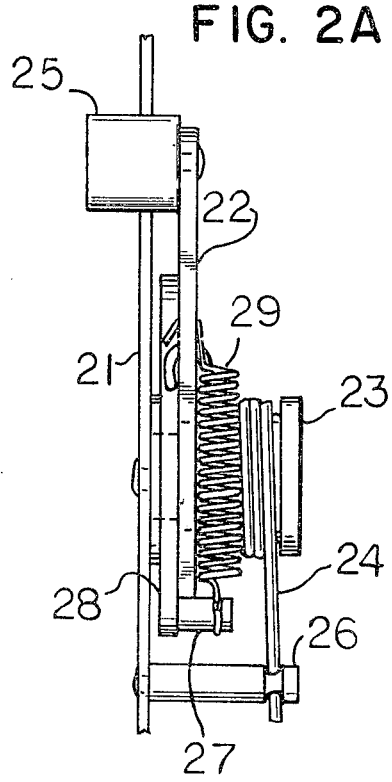
FIG. 2A is an enlarged side view of the primary and secondary actuator arms depicted in FIG. 2.
Figure 2:
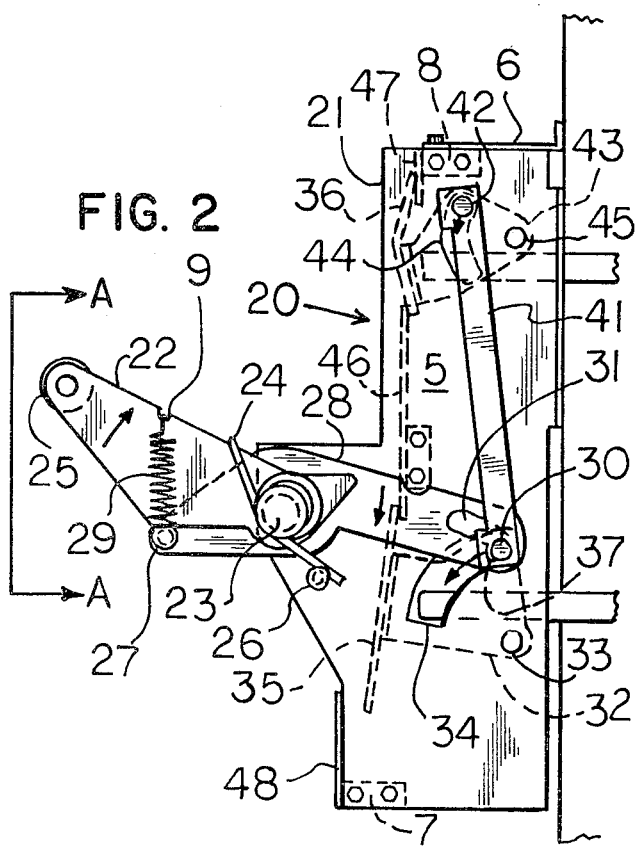
FIG. 2 is an enlarged side view of the shield assembly depicted in FIG. 1.
Figure 4:
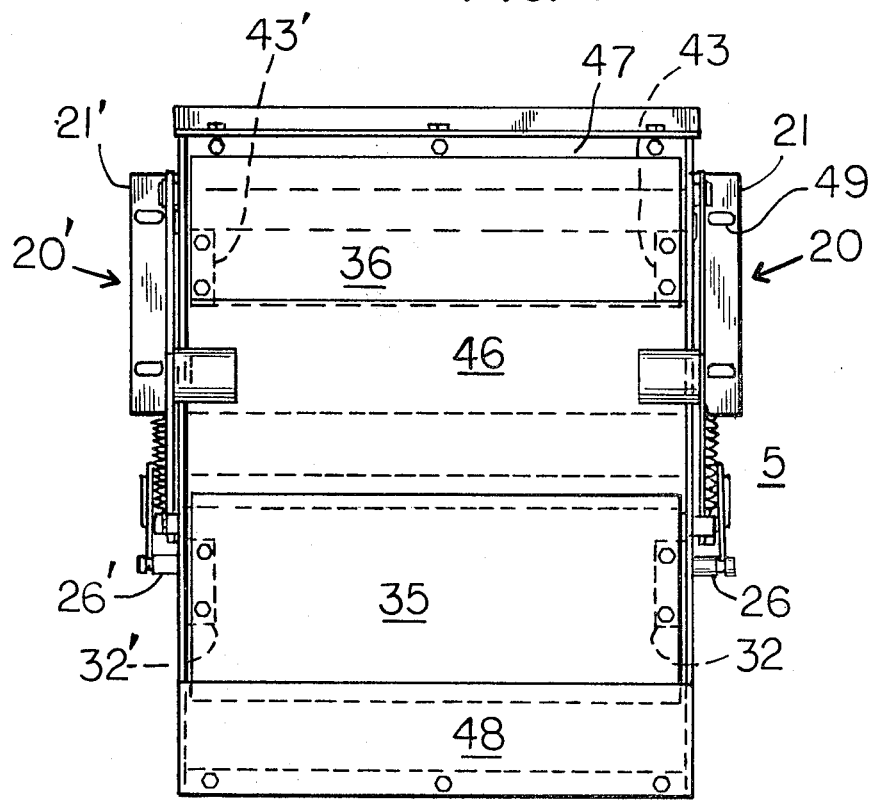
FIG. 4 is a front view of the shield assembly shown in FIG. 1.

Shield assembly 5 is shown in greater detail in FIG. 2 wherein side frame 21 supports primary actuator arm 22 by means of pivot pin 23 and torsion return spring 24 wraps around pivot pin 23 and is retained at one end by primary actuator arm 22 and by return spring pin 26 on side frame 21. Secondary actuator arm 28 is connected to primary actuator arm 22 by means of actuator spring 29 which extends between pin 27 on secondary actuator arm 28 and groove 9 on primary actuator arm 22. The tension exerted by spring 29 is selected to force secondary actuator arm 28 to follow in unison with primary actuator arm 22, when contact pin 25 is moved in a clockwise direction. The torque exerted by return spring 24 is selected to force secondary arm actuator 28 to follow in unison with primary actuator arm 22, when contact pin 25 is moved in a counterclockwise direction because pin 27, through secondary actuator arm 28, extends under primary arm 22 and forces primary arm 22 against the secondary arm 28 as shown in FIG. 2A. One end of secondary actuator arm 28 is pivotably connected to side frame 21 by means of common pivot 23. Link pin 30, retained within secondary actuator arm slot 31 and lower side frame slot 34 supports the other end of actuator arm 28. Lower shield hinge 32 connected to side frame 21 by means of pivot pin 33 is attached to lower moveable shield 35. Upper moveable shield 36 is attached to upper shield hinge 43 which is secured to side frame 21 by means of pivot pin 45. Lower moveable shield 35 and upper moveable shield 36 are interconnected by connecting link 41 through the arrangement of link pin 30 through lower shield hinge 32 at one end and pin 42 through upper shield hinge 43 at an opposite end. Upper side frame slot 44 retains pin 42 and functions to operate upper moveable shield 36 in a manner that will be described below. Center stationary shield 46, top stationary shield 47 and bottom stationary shield 48 are arranged between a right shield side assembly 20 and a left shield side assembly 20' which are shown in FIG. 4. As described earlier, corresponding right and left shield assembly components are employed on opposite sides of breaker compartment 10 such that when reference is made to a component of left shield side assembly 20', the component will have a reference numeral which now corresponds to its complementary component in right shield side assembly 20 with the reference numeral expressed as a prime. This is to avoid any confusion as to left and right shield assembly components. Referring again to FIG. 2, top stationary shield 47 is attached to right side frame 21 by means of a top mounting bracket 8 and bottom stationary shield 48 is attached by means of mounting bracket 7. Bracket 6 located at the top of mounting frames 21, 21', is used to isolate line stabs 11 from compartment 10 when shield assembly 5 is installed in compartment 10.

Figure 3:
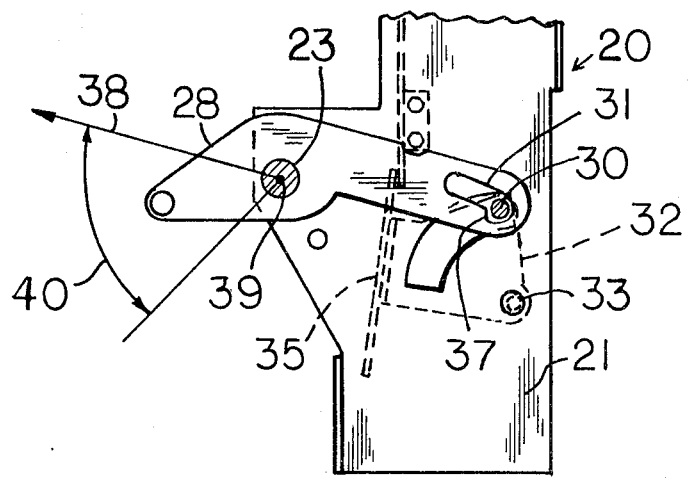
FIG. 3 is a side view of the shield assembly of FIG. 2 with the first actuator arm removed to show the force vector resultant on the second actuator arm.

Before describing the operation of shield assembly 5, reference is made to FIG. 3 in order to point out the relationship between secondary actuator arm 28, pivot pin 23 and the force vector direction arrow 38 relative to the center point 39 of pivot pin 23. The directional momentum arrow 40 resulting from forces exerted upon secondary actuator arm 28 is determined by the location of link pin 30 within secondary actuator arm slot 31 which contains a bottom slot surface 37, the purpose of which will be discussed below. It is to be noted that lower shield hinge 32, fixedly attached to lower moveable shield 35, is also connected with secondary actuator arm 28 through link pin 30.

Figure 7:
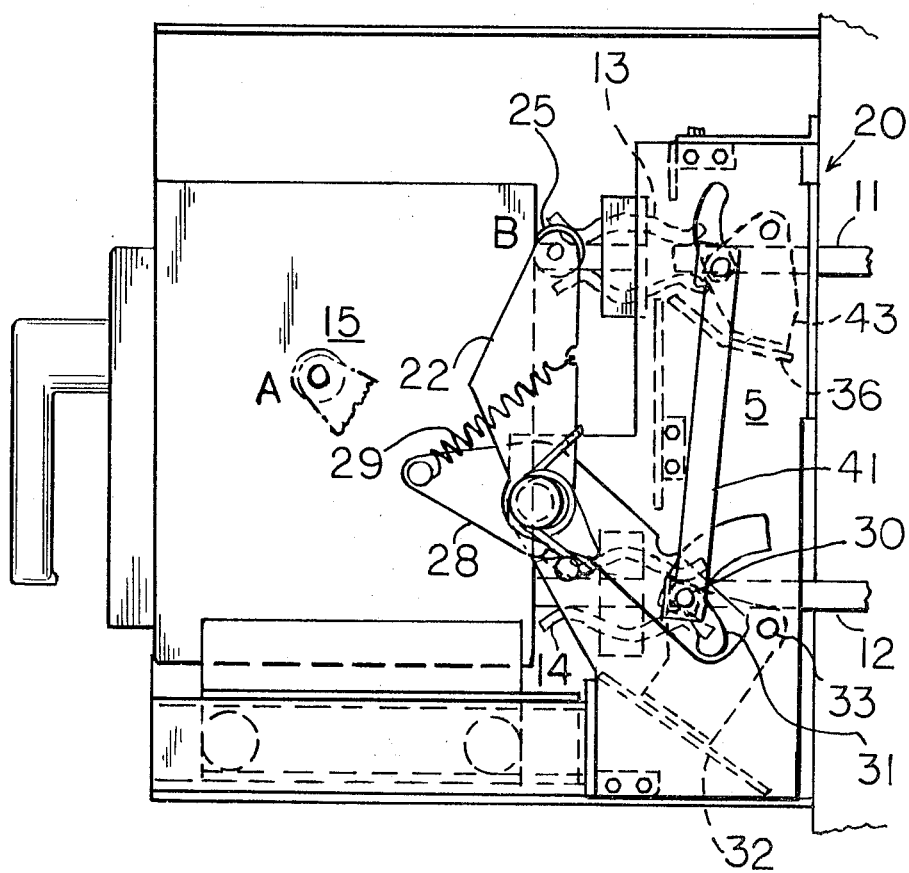
FIG. 7 is a side view of the circuit breaker compartment containing the shield assembly of the invention with the shields in an open position.

In order to describe the operation of shield assembly 5, reference is made to FIGS. 2 and 7 wherein lower moveable shield 35 and upper moveable shield 36 are depicted in a closed position in FIG. 2 with primary actuator arm 22 forced against pin 27 by means of return spring 24. When circuit breaker 15 is inserted within breaker compartment 10, the back portion of circuit breaker 15 contacts breaker contact pin 25 at position A as shown in FIG. 7. When breaker 15 is fully inserted within compartment 10, plugs 13, 14 engage stabs 11, 12. Contact pin 25 and primary actuator arm 22 are rotated to position B. While primary actuator arm 22 is being rotated by breaker 15 from position A to position B, actuator spring 29 is extended causing both pin 27 and secondary actuator arm 28 to likewise move in a clockwise direction, which causes link pin 30 within slot 31 to slide forward along slot 31 in the direction indicated. The movement of link pin 30 effectively connects lower moveable shield hinge 32 with secondary actuator arm 28 causing lower shield hinge 32 to rotate in a counterclockwise direction about lower shield hinge pin 33. Since lower moveable shield 35 is fixedly attached to lower moveable hinge 32, lower moveable shield 35 is moved into the open position shown in FIG. 7. In order for the opening of lower moveable shield 35 to occur, both left and right breaker contact pins 25, 25' must contact the back portion of the circuit breaker. This failsafe feature is an important feature of the instant invention. If only one breaker contact pin 25, 25' is actuated, the opposite shield side assembly 20 or 20' prevents lower moveable shield 35 from opening for the following reason. Referring again to FIGS. 2 and 3, secondary actuator arm 28, holds lower moveable shield 35 in a closed position as shown in FIG. 2, under the tension imposed by return spring 24 via primary actuator arm 22 and pin 27, and forces link pin 30 against the bottom surface 37 of secondary actuator arm slot 31 as described above and more clearly detailed in FIG. 3. In order for link pins 30, 30' to allow shield 35 to assume the open position shown in FIG. 7, the secondary actuator arm bottom slot surfaces 37, 37' would have to move out of the counterclockwise rotational path of the corresponding link pins 30, 30'. If only one primary actuator arm contact pin 25, 25' is actuated, this would result in only one bottom slot surface 37, 37' in the corresponding actuator secondary arm 28, 28' from being rotated out of the path of the corresponding link pin 30, 30'. The other bottom slot surface 37, 37' would remain in the path of the other corresponding link pin 30, 30'. When an attempt is now made to rotate bottom shield 35 counterclockwise to its open position, link pin 30, 30' would engage the corresponding bottom slot surface 37, 37' to prevent such rotation. Secondary actuator arm bottom slot surface 37, 37' is designed such that when contact is made with correponding link pin 30, 30', a force vector is generated which is exerted on the corresponding secondary actuator arm 28, 28' in the direction of vector arrow 38 (FIG. 3) through the center point 39, of pivot point 23, 23'. In order for link pin 30, 30' to displace the bottom slot surface 37, 37' from its counterclockwise path, a force vector would have to be generated to one side of pivot pin 23. This would rotate secondary actuator arm 28, 28' and thus force bottom slot surface 37, 37' out from the path of link 30, 30'. Since this does not occur, pin 30, 30' is retained against corresponding bottom slot surface 37, 37' such that the moveable shield 35 is not permitted to open. Therefore, only contact with both breaker contact pins 25, 25' on both primary actuator arms 22, 22' will cause bottom slot surfaces 37, 37' to move out of contact with corresponding link pins 30, 30' in order for lower moveable shield 35 to move into the open position indicated in FIG. 7.

Bottom stationary shield 48 fixedly attached to both right side frame 21 and left side frame 21' as shown in FIG. 4, sufficiently overlaps lower moveable shield 35 to prevent access to load stabs 12 (FIG. 1) at the bottom of breaker compartment 10. Connecting link 41, best seen in FIG. 2, attached to lower shield hinge 32 by means of link pin 30 and to upper shield hinge 43 by means of pin 42, follows the rotational movement of lower moveable shield 35 and lower shield hinge 32. This counterclockwise rotation of lower moveable shield 35 into the open position shown in FIG. 7 forces connecting link 41 in the downward direction indicated which in turn forces upper shield hinge 43 and attached upper moveable shield 36 to rotate in a counterclockwise direction to the open position. Therefore, when circuit breaker 15 of FIG. 1 is moved along fixed and moveable tracks 19, 18 to within breaker compartment 10, contact with the back portion of circuit breaker 15 forces primary actuator arms 22, 22' upon contact with breaker contact pins 25, 25' into motion in the clockwise direction to open lower moveable shield 35 and upper moveable shield 36. Removing circuit breaker 15 from breaker compartment 10 moves the back of circuit breaker 15 away from right and left breaker contact pins 25, 25' such that primary actuator arms 22, 22' rotate in a counterclockwise direction under the force of return springs 24, 24' releasing actuator springs 29, 29' and forcing secondary actuator arms 28, 28' into counterclockwise rotation to close lower moveable shield 35 as shown in FIG. 2. While closing, lower moveable shield 35 is rotated in a clockwise direction forcing connecting link 41 into an upward direction, opposite to that indicated, so that upper moveable shield hinge 43 and attached upper moveable shield 36 also rotate in a clockwise direction to a closed position against upper stationary shield 47.

FIG. 4 shows stationary shields 46, 47, 48 and moveable shields 35, 36 extending between right and left shield side assemblies 20, 20'. For ease in attachment within the circuit breaker compartment shown in FIGS.

1 and 7, slots 49 are provided within right and left side frames 21, 21'.

Figure 5:
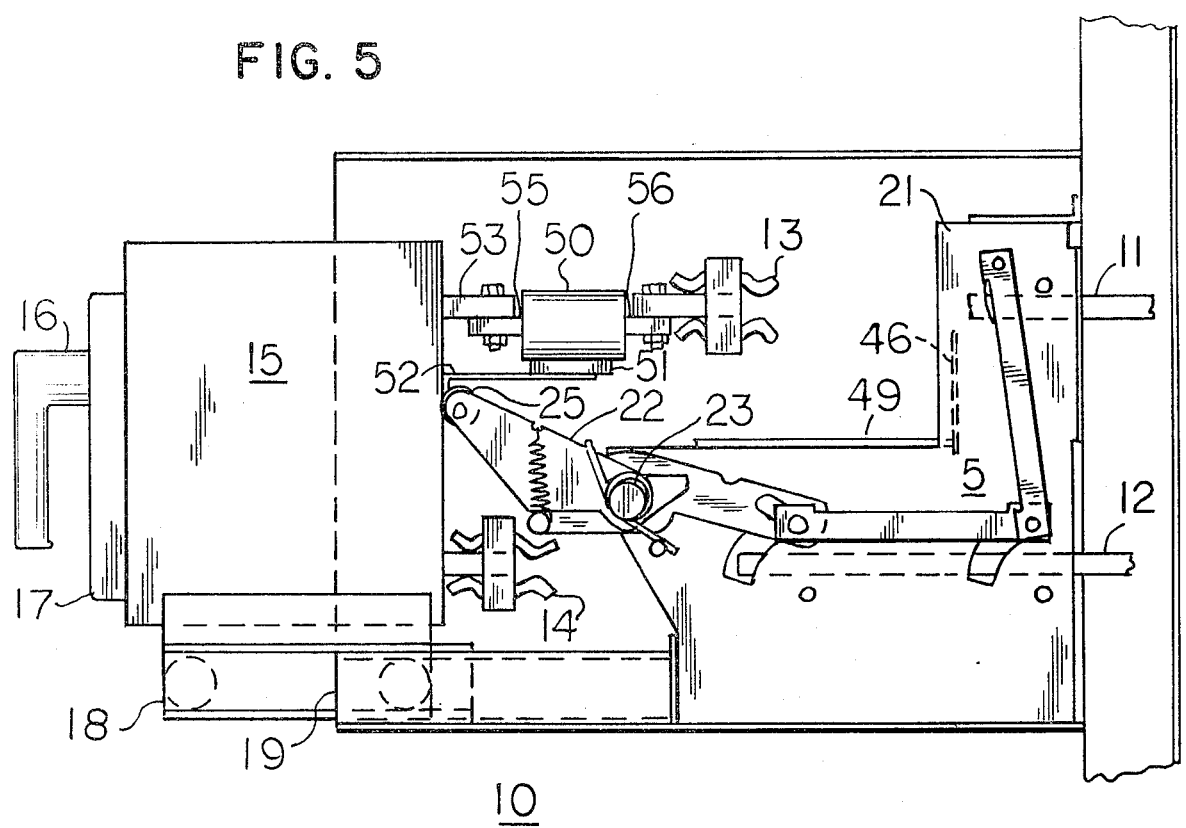
FIG. 5 is a side view of a breaker compartment for a fused circuit breaker containing a shield assembly which includes a frame extension to isolate the breaker power stabs.
Figure 6:
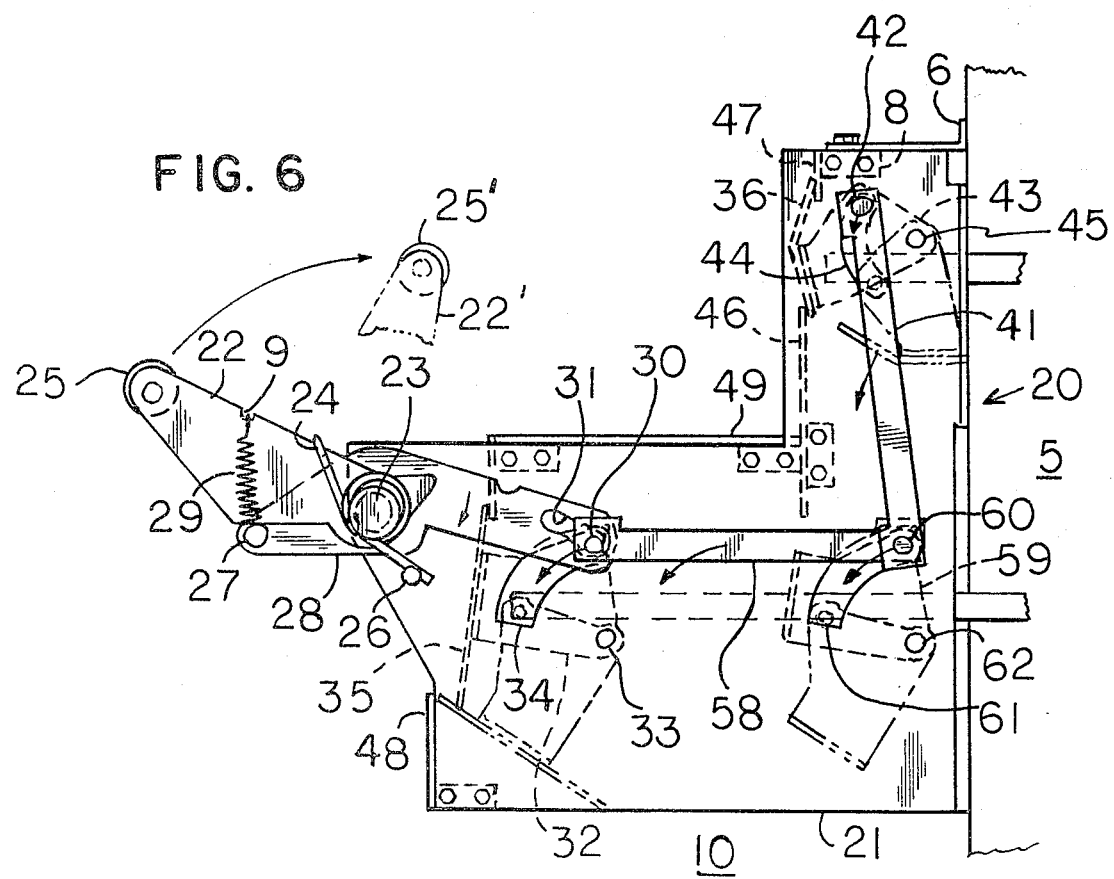
FIG. 6 is a side view of the shield assembly depicted in FIG. 5.

The shield assembly 5 of the instant invention is capable of being installed within a circuit breaker compartment in the field since no modifications are required to either the breaker or the compartment. This is an important feature of this invention. FIGS. 5 and 6 contain a circuit breaker compartment 10 similar to that described in FIG. 1 and, where possible, will contain the same reference figures for similar elements. A fuse 50 is attached to the back of circuit breaker 15 by means of a fuse support 51 which is welded or riveted to circuit breaker 15 at bracket 52. Connection between fuse 50 and circuit breaker bus 53 is made to fuse electrode 55 by bolting or other connecting means. Electrical connection between fuse 50 and line plug 13 is made by connecting fuse electrode 56 to line plug 13 by bolting or other connecting means. Fuse 50 is employed within circuit breaker compartment 10 to protect breaker 15 from excess current occurring at line stab 11. Fused circuit breaker compartment 10 contains a line stab 11 similar to the non-fused breaker compartment 10 of FIG. 1, however, the load stab 12 for the fused circuit breaker compartment 10 shown in FIG. 5 is elongated. Shield mechanism 5 within fused breaker compartment 10 also contains an extension shield 49 along side frame 21 in a plane perpendicular to lower and upper moveable shields 35, 36 as shown in FIG. 6.

FIG. 6 shows the shield assembly 5 of FIG. 5 in greater detail. The functional and structural relationship between primary actuator arm 22 and secondary actuator arm 28 are similar to those of the shield assembly 5 of FIG. 2. Actuator spring 29, return spring 24 and lower moveable shield 35 also work in the manner described earlier for shield mechanism 5 shown in FIG. 2. In order to connect between secondary actuator arm 28 and connecting link 41 within the fused breaker compartment 10, an extension link 58 and reversing bell crank 59 are employed. Extension link 58 is attached at one end by link pin 30 which is retained within secondary actuator arm slot 31 and side frame slot 34. Link pin 30 is connected to lower moveable shield hinge 32 which is pivotally connected to side frame 21 by pin 33. The other end of extension link 58 is attached by pin 60 within slot 61 of side frame 21. Pin 60 is connected to reversing bell crank 59 and reversing bell crank 59 is pivotally connected to side frame 21 by means of pin 62. When the fused circuit breaker 15 of FIG. 5 is moved within breaker compartment 10, contact is made with breaker contact pins 25, 25' on primary actuator arms 22, 22' causing primary actuator arms 22, 22' to move in a clockwise direction. As indicated in phantom in FIG. 6, lower moveable shield hinge 32 is rotated in a counterclockwise direction, also shown in phantom in FIG. 6, to open lower moveable shield 35 as described earlier. Link pin 30 within slot 31 on secondary actuator arm 28, forces extension link 58 to rotate downward in a counterclockwise direction as indicated. Reversing bell crank 59, attached to extension link 58 by means of pin 60, also rotates in a counterclockwise direction about pivot pin 62 as shown in phantom. Connecting link 41, connected to reversing bell crank 59 by means of pin 60, is moved in a downward vertical direction. The downward movement of connecting link 41, attached to upper moveable shield hinge 43 by pin 42 results in the counterclockwise rotation of upper moveable shield hinge 43 about pivot point 45 causing upper moveable shield 36 to open. Removal of the circuit breaker from the compartment causes primary actuator arm 22, to move in a counterclockwise direction under the influence of return spring 24. Lower moveable shield hinge 32, upon rotating in a clockwise direction, closes lower moveable shield 35 and pulls extension link 58 in an upward clockwise direction along with reversing bell crank 59. Connecting link 41 is now moved in a vertically upward direction and by means of the connection between pin 42 and upper moveable shield hinge 43 causes upper moveable shield hinge 43 to rotate in a clockwise direction about pivot 45 closing upper moveable shield 36.

Having described my invention, what I claim as new and desire to secure by Letters Patent is:

1. A shield assembly for attaching within a circuit breaker compartment to isolate line and load stabs within the compartment from line and load plugs on a circuit breaker comprising:

a pair of top and bottom moveable shields pivotally connected to a mounting frame by means of top and bottom hinges;

a pair of first and second actuator arms pivotally attached to said mounting frame by a common pivot pin;

a connecting link connected at a bottom end to said second actuator arm and to said bottom hinge by means of a bottom link pin and connected at a top end to said top hinge by means of a top link pin for moving said top shield into a closed or open position when said bottom shield is moved into an open closed position; and means defining a slot within said second actuator arm capturing said bottom link pin and forcing said connecting link in a first direction to open said top and bottom shields and in an opposite direction to close said top and bottom shields.

2. The assembly of claim 1 including a first spring attached to said first actuator arm at one end and to a pin on said mounting frame at an opposite end to hold said first actuator arm against a pin extending from said second actuator arm and to force said first and second actuator arms to move in unison in said opposite direction.

3. The assembly of claim 2 including a second spring attached to said first actuator arm at one end and to said second actuator arm pin at an opposite end to hold said first actuator arm against said second actuator arm pin and force said first and second actuator arms to move in unison in said first direction.

4. The assembly of claim 1 wherein said second actuator arm slot includes a recess for retaining said bottom link pin under the bias of said first spring and preventing said top and bottom shields from opening until said first actuator arm is actuated to overcome said first spring bias and allow said bottom link pin to travel within said second actuator arm slot.

5. The assembly of claim 1 including top, middle and bottom stationary shields abutting said top and bottom moveable shields for providing further isolation to said compartment line and load stabs.

6. The assembly of claim 1 further including means defining top and bottom slots within said mounting frame, said bottom slot providing clearance for said bottom link pin and said top slot providing clearance for said top link pin.

7. The assembly of claim 3 wherein said first spring comprises a torsion spring and said second spring comprises an extension spring.

8. A circuit breaker compartment comprising:

means defining a closure containing a plurality of line and load stabs for connection with corresponding line and load plugs extending from a moveably mounted circuit breaker;

a shield assembly consisting of a pair of top and bottom moveable shields hingeably supported between a pair of side frames, one of said side frames on each side of said closure, said shield assembly arranged intermediate said circuit breaker and said line and load stabs for providing isolation between said line and load stabs via said top and bottom shields when said breaker is removed from said closure and for allowing access to said line and load stabs when said breaker is within said closure, said top and bottom shields being interconnected by a pair of connecting links, one on each of said side frames;

a pair of first and second actuator arms connected to each of said side frames by a common pivot, said second actuator arms being connected within second actuator arm slots to said connecting links by means of link pins, said first and second actuator arms being spring loaded together by means of tension springs extending between said first actuator arms and pins on said second actuator arms to cause said first and second actuator arms to move in unison in a clockwise direction driving said connecting links downwards to open said top and bottom shields, said first and second actuator arms being spring loaded together by torsion springs connecting between said first actuator arms and pins on said side frames, said torsion springs being arranged around said common pivots, said first actuator arms contacting said second actuator arm pins and forcing said first and second actuator arms to move in unison in a counterclockwise direction to drive said connecting links upwards to close said top and bottom shields.

9. The circuit breaker compartment of claim 8 including:

means defining bottom recesses within said secondary actuator arm slots for capturing said link pins under spring force provided by said torsion springs on said first and second actuator arms when said circuit breaker is out of contact with each of said first actuator arms to prevent said link pins from moving within said second actuator arm slots and thereby prevent said linkage arms from moving downwards to open said top and bottom shields unless both of said first actuator arms are actuated, whereby said first actuator arms overcome said torsion spring forces to release said link pins from said bottom slot recesses to allow said link pins to move along said secondary actuator arm slots and allow said linkage arms to move downwards to open said top and bottom shields.

10. A shield assembly for use with fused circuit breakers within a circuit breaker compartment comprising:

a side mounting frame;

a pair of first and second shields hingeably connected to said mounting frame;

a pair of first and second actuator arms pivotally attached to said mounting frame;

an extension shield on said mounting frame in a plane perpendicular to said first and second moveable shields;

an extension link connecting between said second actuator arm and a connecting link for causing said first and second shields to open and close in unison when said first actuator arm contacts a portion of a fused circuit breaker; and means defining a guide slot within said second actuator arm for guiding said connecting link in a first direction to open said pair of shields and in an opposite direction for closing said pair of shields.

11. The assembly of claim 10 including a bell crank hinge pivotally connected to said side frame and supporting said extension link and said connecting link for transmitting motion from said first to said second shield causing said first and second shields to move in unison.

12. The assembly of claim 10 including a first spring contacting said first actuator arm at one end and contacting a pin on said mounting frame at an opposite end for causing said first and said second actuator arms to move in unison when said first actuator arm contacts a pin extending from said second actuator arm.

13. The assembly of claim 10 including a second spring connecting with said first actuator arm at one end and said second actuator arm pin at an opposite end for holding said first actuator arm in contact with said second actuator arm pin.

14. The assembly of claim 20 wherein said extension link is connected to said connecting link by a link pin and wherein said second actuator arm slot further includes a recessed surface for retaining said link pin until said first actuator arm is contacted by a circuit breaker.

15. An improved circuit breaker compartment of the type containing a track for carrying a moveable circuit breaker and a plurality of line and load stabs extending from one end of said compartment wherein the improvement comprises:

a pair of shield assemblies, one on either side of said compartment for isolating said line and load stabs when said circuit breaker is removed from said compartment;

said shield assemblies comprising a pair of first and second shields higheably connected to a mounting frame;

a pair of first and second actuator arms pivotally attached to said mounting frame and means defining a guide slot within said second actuator arm for guiding said connecting link in a first direction to open said pair of shields and in an opposite direction for closing said pair of shields;

an extension link connected to one of said actuator arms at one end and to a connecting link by means of a link pin at an opposite end, said connecting link being attached to one of said shields; and a first spring connecting between said first actuator arm and said side frame for returning said first actuator arm in a counterclockwise direction when said circuit breaker is removed from said compartment, and a second spring connecting between said first and second actuator arms for causing said first and said second actuator arms to move in unison.

* * * * *